cross-linking agents in the same manner as the low molecular weight compounds mentioned above. For example polyglycol ethers such as polyethylene glycol, polyvinyl alcohol, polyethylene imine, epoxy resins, polyesters containing free —OH groups, and copolymers comprising β-hydroxyethylacrylate or β-t.-butyl-amino-ethyl-acrylate or methacrylate can be employed. The surprising easy cross-linking of the coating materials according to the present invention at ordinary temperatures or on slight warming, and/or on addition of a catalyst such as phosphoric acid or a sodium alcoholate, has already been mentioned. Cross-linking takes place quantitively, and at room temperature in many cases. The cross-linking reaction is an addition reaction: no by-products are produced by the reaction.

The mixtures of the invention have a pot life sufficient to use them as coating or impregnating agents, as adhesives, or—optionally together with fillers—as patching materials.

To prepare coatings, the copolymers of the invention are suitably dispersed, that is dissolved or suspended, together with a cross-linking agent or after partial cross-linking, in a volatile organic liquid such as an ester, hydrocarbon, ether, or ketone. This material is then applied to a substrate by brushing, spraying, dipping, or other usual techniques.

Because of the cross-linking reaction, dispersions of the copolymers of the invention tend to form gels on standing, and thus to become unsuitable for applications by means such as a brush or spray gun. However, the pot life of the coatings of the invention can be extended in every case (1) by including in the copolymer from 0.5 to 20 percent, by weight of the total monomers exclusive of the cross-linking agent, of a copolymerizable ethylenically unsaturated carboxylic acid such as acrylic, methacrylic, itaconic, or maleic acids, and/or (2) dispersing or dissolving the copolymer coating material in a ketone or solvent mixture containing a ketone.

Suitable volatile ketone solvents include aliphatic and cycloaliphatic ketones such as acetone, methyl-ethyl-ketone, methyl-isobutyl-ketone, and cyclohexanone, among others.

An increase in pot life is also observed if a keto group is present in the copolymer rather than in the solvent, or if the solvent contains a carboxylic acid group.

The new azlactone copolymers are superior to previously known products in a variety of useful properties. In many cases, products which are extraordinarily stable toward hydrolysis, temperature, and the influence of weathering are produced on cross-linking, such as the carbonamide compounds shown above to be produced with a diamine or polyamine cross-linking agent or the stable esters produced on cross-linking with a diglycol or polyglycol. It should be mentioned that coating materials cross-linked with amines are characterized by an outstanding adhesion to most substrates.

A direct cross-linking of the azlactone polymers of the invention with reactive groups of a substrate, for example with the hydroxy groups of cellulose or of a polyester, can be brought about if an amount of cross-linking agent insufficient for complete reactionwith all azlactone groups is employed as added component (C).

Although the reaction of the azlactone groups of the polymers with cross-linking agents to form insoluble and infusible polymers is of principal significance, reaction of the polymers with compounds having only one reactive hydrogen atom should be mentioned. For example, permanently colored polymers can be prepared by reaction of the copolymers of the invention with dye molecules having an active hydrogen atom. Reaction with corresponding azo compounds, which on heating build cross-links with cleavage of nitrogen, makes possible the preparation of graft copolymers wherein the number of graft branches per molecule can be predetermined by suitable choice of the number of azlactone groups incorporated therein.

Graft copolymers of this type can be employed, for example, as lubricating oil additives having a disperstant and detergent effect. They can also be prepared directly by the addition of suitable molecular chains to a reactive end group.

A better understanding of the present invention and of its many advantages will be had by referring to the following specific examples, given by way of illustration. In the examples, all parts are by weight.

EXAMPLE 1

One-half of a mixture consisting of 50 parts of ethyl acrylate, 40 parts of methyl methacrylate, 10 parts of 2-isopropenyl-4,4-dimethyl oxazolone, 1.2 parts of azo bis (isobutyronitrile), and 100 parts of ethylacetate was heated in a reaction vessel with stirring at a temperature of about 70° C. After the onset of polymerization, the vessel temperature was held at about 70° C.–80° C. while the other half of the mixture was run in. One hour after addition was completed, an additional 0.2 part of azo bis-(isobutyronitrile) was added. The solution was then warmed for another 4–5 hours at 70° C.–80° C. After cooling, 2.1 parts of ethylene diamine were added. Films prepared from the resulting solution at 30° C. are cross-linked. The films are slightly swollen by organic solvents such as acetone or acetic acid ester, but are not soluble in these solvents.

The 2-isopropenyl-4,4-dimethyl oxazolone employed in this example was prepared from N-methacrylyl-α-amino-isobutyric acid as follows.

10.4 parts of methacrylic acid chloride and 24 parts of a sodium hydroxide solution consisting of four parts of sodium hydroxide and 20 parts of water were simultaneously added dropwise over a period of two hours with stirring to a solution of 10.3 parts of α-amino-iso-butyric acid, 4 parts of sodium hydroxide, and 20 parts of water. The reaction temperature was kept between 0° C. and 5° C. by cooling. Subsequently, about 10.5 parts of concentrated hydrochloric acid were added with stirring until a reaction is observed with Congo Red. The crystal slurry produced in this manner is quickly filtered with suction, washed with water, and dried at 60° C. Recrystallization from acetic acid ester is used for purification.

The synthesis gives an 85% yield of N-methacrylyl-α-amino-isobutyric acid having a melting point of 160° C.–162° C. The elemental analysis is as follows:

Found (percent): C, 56.1; H, 7.9; N, 8.3. Calculated (percent): C, 56.2; H, 7.6; N, 8.2.

The product was cyclized to the azlactone as follows. 17.1 parts of N-methacrylyl-α-amino-isobutyric acid were heated, while stirring, with 15.3 parts of acetic acid anhydride, and were held at this temperature for 10 minutes. After fractionation of the reaction mixture, the azlactone is obtained in a yield of 80–85%. The boiling point of the material is 63° C.–64° C./11 mm. Hg. The elemental analysis is as follows:

Found (percent): C, 62.7; H, 7.6; N, 8.9. Calculated (percent): C, 62.7; H, 7.2; N, 9.2.

EXAMPLE 2

A mixture of 22 parts of butyl acrylate, 10 parts of acrylonitrile, 30 parts of methyl methacrylate, 30 parts of styrene, and 8 parts of 2-isopropenyl-4-methyl-4-propyloxazolone was copolymerized in 60 parts of ethyl acetate and 40 parts of methyl ethyl ketone in the presence of 1 part of azo bis(isobutyronitrile) as in Example 1.

Films insoluble in the common organic solvents were produced even at a drying temperature of about 30° C. on addition of 2.7 parts of hexamethylene diamine to the polymer solution.

EXAMPLE 3

A mixture of 80 parts of butyl methacrylate, 10 parts of N-methyl methacrylamide, and 10 parts of cyclohexane-spiro-4-(2-vinyl-oxazolone) was polymerized in the presence of 1.5 parts of dilauryl peroxide in 80 parts of ethylene glycol acetate and 80 parts of methyl ethyl ketone as in Example 1 (with subsequent addition of 0.2 part of dilauryl peroxide).

Upon the addition thereto of 2.0 parts of butane diol and 0.1 part of p-toluene sulfonic acid, the solution produced insoluble films at drying temperatures of about 30° C.

EXAMPLE 4

A mixture of 30 parts of 2-ethyl hexyl acrylate, 40 parts of methyl methacrylate, 15 parts of methacrylic acid, and 15 parts of 2-vinyl-4-methyl-4-phenyl-oxazolone was polymerized as in Example 1 with 1.5 parts of azo bis(isobutyronitrile) in 100 parts of ethylene glycol acetate.

The polymer solution gave insoluble films upon addition of 6.0 parts of adipic acid dihydrazide.

EXAMPLE 5

A mixture of 60 parts of methyl acrylate, 18 parts of vinyl acetate, 12 parts of diethyl fumarate, and 10 parts of 2-vinyl-4-methyl-4-benzyl-oxazolone was polymerized in the presence of 0.9 part of azo bis(isobutyronitrile) in 80 parts of ethyl acetate, and 70 parts of methyl ethyl ketone as in Example 1.

Insoluble films were prepared from this solution after the addition thereto of 50 parts of a 50 percent solution of a copolymer of vinyl acetate and vinyl alcohol (80/20 weight percent) in methyl ethyl ketone, which solution additionally contained 0.1 part of p-toluene sulfonic acid.

EXAMPLE 6

A copolymer comprising 10 percent of ethylene, 82 percent of methyl acrylate, and 8 percent (all by weight) of 2-isopropenyl-4,4-diethyl oxazolone was prepared by reacting a mixture of 320 parts of methyl acrylate, 30 parts of 2-isopropenyl-4,4-diethyl-oxazolone, 6 parts of the sodium salt of a paraffin sulfonic acid, 4 parts of an oxyethylated high molecular weight aliphatic alcohol, 1 part of azo bis(isobutyronitrile), and 3 parts of potassium persulfate in 650 parts of water with ethylene for 36 hours at 60° C. under a pressure of 80 atmospheres. (See German patent publication 1,022,796.)

Dispersions of the copolymer obtained in this manner gave an insoluble film after precipitation, purification, drying, and redispersion in a volatile liquid together with 0.5 percent by weight of ethylene diamine.

EXAMPLE 7

One-half of a mixture comprising 50 parts of ethyl acrylate, 40 parts of methyl methacrylate, 10 parts of 2-isopropenyl-4,4-dimethyl-oxazolone, 1.2 parts of azo bis-(isobutyronitrile), and 100 parts of ethyl acetate was heated in a reaction vessel with stirring at about 70° C. After polymerization had begun, the temperature was held at about 70–80° C. while the remaining half of the mixture was run in. One hour after the addition, another 0.2 part of azo bis(isobutyronitrile) was added. This solution was kept 70° C.–80° C. for a further 4–5 hours and then, after cooling, combined with 4.7 parts of N-(aminoethyl)-piperazine.

Films prepared from this solution at 30° C. are cross-linked. The films are slightly swollen by solvents such as acetone or ethyl acetate, but are insoluble in these solvents.

EXAMPLE 8

A mixture of 60 parts of n-butyl methacrylate, 20 parts of methyl methacrylate, 13 parts of β-dimethyl-amino-ethyl methacrylate, and 7 parts of 2-isopropenyl-4,4-dimethyl-oxazolone was polymerized according to Example 1 in 60 parts of butyl acetate and 40 parts of xylene in the presence of 1.2 parts by weight of azo bis(isobutyronitrile). The solution was mixed with a copolymer of 48 parts of n-butyl methacrylate, 24 parts of methyl methacrylate, and 8 parts of β-hydroxy-ethyl methacrylate dissolved in a mixture of 48 parts of butyl acetate and 32 parts of xylene.

After the addition of 0.2 part of p-toluene sulfonic acid, an insoluble film was formed by this mixture on drying.

EXAMPLE 9

Proceeding as in Example 1, a mixture of 50 parts of ethyl acrylate, 38 parts of methyl methacrylate, 10 parts of 2-isopropenyl-4,4-dimethyl-oxazolone, and 2 parts of itaconic acid was polymerized in 100 parts by weight of ethyl aceate in the presence of 1.2 parts by weight of azo bis(isobuyronitrile). The solution was diluted to a solids content of 25 percent by the addiion of ethyl acetate and then reacted with 2.1 parts of ethylene diamine.

EXAMPLE 10

One half of a mixture of 46.5 parts of ethyl acrylate, 3.5 parts of maleic acid, 40 parts of methyl methacrylate, 10 parts of 2-isopropenyl-4,4-dimethyl-oxazolone, 1.2 parts of azo bis(isobutyronitrile), and 100 parts of ethyl acetate was heated in a reaction vessel with stirring at about 70° C. After the onset of polymerization, the other half of the mixture was run in while the temperature was maintained at about 70 °C.–80° C. One hour after all of the material had been added, 0.2 part of azo bis(isobutyronitrile) was added. The solution was heated for a further four to five hours at 70° C.–80° C. and, after cooling, was combined with 2.1 parts of ethylene diamine. Flms prepared from this solution at 30° C. are cross-linked. The films are easily swollen by organic solvents such as acetone or ethyl acetate, but are insoluble in these solvents.

EXAMPLE 11

A mixture of 50 parts of ethyl acrylate, 38 parts of methyl methacrylate, 10 parts of 2-isopropenyl-4,4-dimethyl-oxazolone, and 2 parts of methacrylic acid was polymerized in the presence of 1.2 parts of azo bis(isobutyronitirle) in 100 parts of ethyl acetate as in Example 1. The solution was then thinned to a solids content of 25 percent by addition of ethyl acetate and 2.1 parts of ethylene diamine were added. Gelation of the soluton was determined visually to begin about 1½ hours after addition of the diamine.

In contrast, a 25 percent solution of the polymer of Example 1, which is the same as that in this example except for not containing an acid comonomer, began to gel after only ½ hour. The error introduced by visual determination of the gel point is far less than the clearly definite difference in pot life.

EXAMPLE 12

Example 1 was repeated but the copolymer solution was thinned to a solids content of 25 percent by the addition of methyl-isobutyl-ketone. Subsequently, the same amount of ethylene diamine as in Example 1 was added to this solution. Gelation of the solution began after five hours. That is the same degree of cross-linking took ten times longer to achieve in the ketone solution than when the same copolymer is dissolved in a liquid free of ketone.

EXAMPLE 13

A mixture of 60 parts of ethyl acrylate, 30 parts of methyl methacrylate, and 10 parts of 2-isopropenyl-4,4-dimethyl-oxazolone was stirred into a mixture, heated to 80° C., of 150 parts of fully desalted water, 0.3 part of the sodium salt of 4,4'-dicyano-4,4'-azo-divaleric acid, and 4.5 parts of a non-ionic dispersant such as isononyl phenol reacted, per mol, with 50 mols of ethylene oxide.

0.78 part of ethylene diamine were stirred into 100 parts of the dispersion prepared as described above. The film obtained by drying this mixture at 30° C. was only slightly swollen by organic solvents such as acetone or ethyl ace acetate, but did not dissolve. A film prepared under

United States Patent Office 3,583,950
Patented June 8, 1971

3,583,950
AZLACTONE COPOLYMERS
Fritz Kollinsky, Darmstadt-Eberstadt, and Klaus Hubner and Gerhard Market, Ober Ramstadt-Eiche, Germany, assignors to Rohm & Haaas G.m.b.H., Darmstadt, Germany
No Drawing. Continuation-in-part of application Ser. No. 650,238, June 30, 1967. This application Nov. 27, 1968, Ser. No. 779,651
Claims priority, application Germany, Dec. 1, 1967, P 17 45 348.4
The portion of the term of the patent subsequent to Jan. 6, 1987, has been disclaimed
Int. Cl. C08f 17/00; C08g 20/08
U.S. Cl. 260—78      10 Claims

ABSTRACT OF THE DISCLOSURE

A cross-linkable azlactone coplymer consisting essentially of: (A) 0.5 to 30 percent of an azlactone of the formula

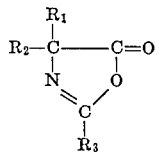

wherein $R_1$ and $R_2$, taken alone, are each the same or different alkyl, cycloalkyl, aryl, or aralkyl, or, taken together with the carbon atom to which they are joined, form a carbocyclic or heterocyclic ring, and $R_3$ is a group containing a polymerizable ethylenic bond; and (B) 99.5 to 70 percent of one or more olefinically unsaturated monomers copolymerizable therewith, all percentages being by weight of all copolymerized monomers. Method of making such copolymers. Method of cross-linking said copolymers. Cross-linked products of said copolymers.

---

This application is a continuation-in-part of copending application Ser. No. 650,238, filed June 30, 1967 (now abandoned).

The present invention relates to azlactone copolymers useful as coating materials, to methods of making the same, to methods of cross-linking said copolymers, and to cross-linked products.

It is known in the art to coat substrate materials such as metal, wood, paper, cardboard, leather, or textiles with a solution or dispersion of film-forming plastics, or to use these as surface paints, and then subsequently to impart desired properties such as insolubility, increased surface hardness, and improved mechanical strength to the resulting coating by way of a cross-linking or hardening reaction. Exemplary of such cross-linking mechanisms is the cross-linking of vinyl copolymers consisting principally of acrylic acid esters or methacrylic acid esters, which copolymers are unexcelled from the viewpoint of lack of color and resistance to weathering. These copolymers, partially comprising methylol compounds, or capped methylol compounds such as methylol ethers, of acrylamide or methacrylamide are cross-linked by heating, optionally under the additional influence of catalysts. If uneconomically long hardening times are to be avoided, temperatures of 120° C.–180° C. must be used for the cross-linking.

The incorporation into vinyl polymers of other highly reactive groups capable of cross-linking is precluded either by the limited accessibility of the corresponding vinyl monomers in technical amounts or by the necessity for energetic conditions for cross-linnking. A cross-linking mechanism for vinyl polymers which succeeds using technically accessible highly reactive monomers and which brings about cross-linking under mild reaction conditions is not yet known.

The present invention relates to azlactone copolymers useful as coating materials which copolymers cross-link at room temperature or on gentle heating to about 80° C., optionally in the presence of an acid or alkaline catalyst, and which, when cross-linked, form valuable films. The copolymers according to the invention are prepared by copolymerizing: (A) 0.5–30 percent by weight, preferably 1–10 percent of an azlactone of the general formula:

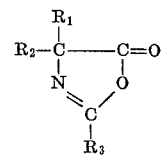

in which $R_1$ and $R_2$ taken alone each signify the same or different alkyl, cycloalkyl, aryl, or aralkyl groups, or taken together with the carbon atom to which they are joined signify a carbocyclic or heterocyclic ring, and $R_3$ is a group containing a polymerizable carbon carbon double bond; with (B) 99.5–70 percent by weight of one or more olefinically unsaturated monomers copolymerizable therewith, suitably vinyl or vinylidene compounds.

This copolymer may be cross-linked with (C) 0.1 to 99.5 percent of a low or high molecular weight cross-linking agent having at least two azlactone-reactive functional groups to form materials suitable as coatings, all percentages being by weight of the combined monomers (A) and (B) subjected to copolymerization, the higher proportions of (C) being used if (C) are high molecular weight compounds.

The copolymerization of (A) and (B) proceeds in bulk, or as an emulsion or solution polymerization, at temperatures of from 0° C. to 200° C. in the presence of a free-radical initiator. Suitable initiators include azo compounds such as azo-bis(isobutyronitrile) and per compounds such as the peroxides (e.g. lauryl peroxide) and per-acids. The resulting copolymer may then be cross-linked with cross-linking agent (C).

The copolymers of the invention can be used as coating materials by applying a solution or dispersion thereof to a substrate to be coated and completing the cross-linking in situ, suitably after addition of a catalyst promoting cross-linking, e.g. either an inorganic or organic acid such as phosphoric acid or p-toluene sulfonic acid or a base such as a sodium alcoholate.

As the groups $R_1$ and $R_2$ in the 4-position of the oxazolones, lower alkyl groups and particularly straight chain lower alkyl groups such as methyl, ethyl, n-propyl, and n-butyl groups are of particular interest. If one of the groups is a longer chain or branched chain alkyl, a cycloalkyl group, an aryl group such as phenyl, or an aralkyl group such as benzyl, then the second radical is preferably a methyl or ethyl group. Azlactones (oxazolones) having two large groups in the 4-position are difficult to prepare and are relatively less reactive. As mentioned, the two radicals R can also form a preferably 5- or 6-membered carbocyclic or heterocyclic ring together with the carbon atom in the 4-position. The polymerizable derivatives of 4,4-dimethyl-oxazolone and of 4,4-pentamethylene-oxazolone are of greatest interest from the point of view of their ease of preparation in technical quantities and their reactivity in cross-linking.

The radical $R_3$, which has a polymerizable unsaturation, is in the simplest case a vinyl group, but is preferably an isopropenyl group. Further, $R_3$ can be an acryloxyalkyl or methacryloxyalkyl group or an acrylamidoalkyl or methacrylamidoalkyl group.

The following azlactones (or oxazolones) are exemplary of those which may be used as component (A) of the copolymer according to the invention:

2-isopropenyl-4,4-dimethyl-oxazolone;
2-isopropenyl-4-methyl-4-propyl-oxazolone;
2-isopropenyl-4,4-dipropyl oxazolone;
2-vinyl-4-methyl-4-benzyl-oxazolone;
2-acryloxethyl-4-methyl-4-cyclohexyl-oxazolone;
2-vinyl-4-methyl-4-phenyl-oxazolone;
2-(2'-N-methacrylamido-isopropyl)-4,4-dimethyl-oxazolone;
cyclohexane-spiro-4-(2-isopropenyl-oxazolone); and
tetrahydropyran-4-spiro-4'-(2'-vinyl-oxazolone).

Azlactones can be considered to be anhydrides of α-acylamino acids and can be prepared from these acids by the removal of water, for example using acetic acid anhydride ("Organic Reactions," vol. 3, 1949, pages 198 et seq.). As exemplary of the preparation of a polymerizable azlactone, the reaction of α-amino isobutyric acid with methacrylic acid chloride, with subsequent ring closure, is shown below:

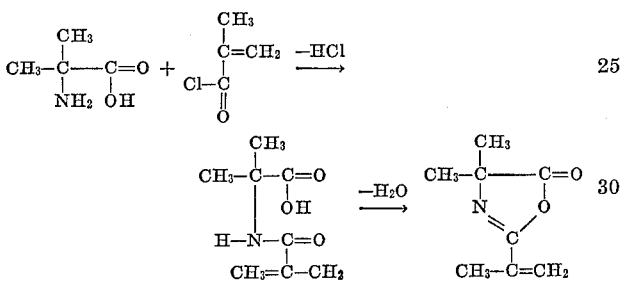

Although in principle all α-amino carboxylic acids can be used for the preparation of polymerizable azalactones, whose azlactones prepared from α,α-di-substituted glycines, advantageously those prepared from α,α-dialkyl glycines, and specifically those prepared from α,α-dimethyl glycine, are preferred. On the one hand, these compounds are sufficiently stable to be simply prepared with good yields. On the other hand, they copolymerize well with other monomers and nevertheless promote easy and complete cross-linking upon reaction with bi-functional or polyfunctional compounds. It must be considered surprising that azlactones derived from a dialkyl glycine, particularly from dimethyl glycine, are easily obtainable stable monomers which readily copolymerize, and yet that the 5-membered ring incorporated into such a copolymer will open easily in the presence of a bi-functional or polyfunctional compound to permit bond formation by way of addition according to the exemplary formulas given later. The utility of such dialkylated azlactones in carrying out the process according to the invention is increased by the fact that they are easily prepared on a large scale from cheap starting materials.

On copolymerization with a further comonomer according to the present invention, an azlactone molecule is incorporated into the main chain of the macromolecule by way of the unsaturated polymerizable group shown earlier as $R_3$ in the general formula for the azlactone.

As suitable monomers (B) to be copolymerized with these azlactones are vinyl and vinylidene compounds such as styrene and its homologs such as vinyl toluene and α-methyl styrene; vinyl esters such as those of saturated carboxylic acids like acetic, propionic, butyric, or still higher acids which may be branched (for example in the α-position); olefins, particularly acyclic olefins having 2–6 carbon atoms and 1 or 2 double bonds such as ethylene, propylene, butadiene, isoprene, or 2-chloro-butadiene; N-vinyl pyrrolidone; vinyl halides such as vinyl chloride; acrylic and methacrylic acids and their nitriles, amides, and N-substituted amides; and esters of acrylic and methacrylic acid, particularly those of alcohols having 1–18 carbon atoms such as the methyl, ethyl, and propyl esters, the n-, iso- and t-butyl esters, and the hexyl, cyclohexyl, 2-ethyl-hexyl, and octyl esters. The alcohols in these esters may be substituted, as, for example, the dimethylamino ethyl esters and their quaternization products, or monoesters of glycol, glycerin, diglycol, or 1,4-butanediol, all of which are also effective as cross-linking agents. These comonomers also include polymerizable dicarboxylic acids such as maleic, fumaric, or itaconic acids, or their esters. Products produced from a monomer mixture comprising at least 50% of weight of acrylic or methacrylic acid esters are preferred because of their outstanding weatherability.

Copolymers containing azlactone groups may react with compounds having the active hydrogen atoms by ring opening according to the following schematic formula:

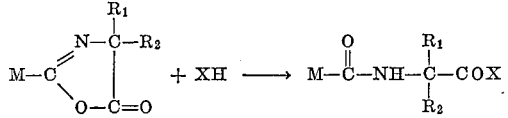

wherein M is the radical of a macromolecule, and XH is a compound having an active hydrogen. If XH is an aliphatic alcohol, for example, the ester grouping —CO—OAlkyl is formed; if XH is a primary aliphatic amine, the amide grouping —CO—NH— Alkyl is obtained. In an analogous fashion, mercaptans form thiol ester groups, hydrazines form the corresponding hydrazides, and carboxylic acids form anhydrides (which however are not resistant to hydrolysis and are unsuitable for permanent cross-linking.) The reaction of amines is quantitative even at room temperatures if lower alkyl groups, particularly methyl groups or a pentamethylene ring, are present in the 4-position. However, with alcohols, a reaction occurs at room temperature only under the influence of acid catalysts such as sulfonic acids, particularly p-toluene sulfonic acid, sulfuric acid, phosphoric acids, and the like. At higher temperatures, the materials react without catalysts. The larger and the more highly branched the substituent in the 4-position of the oxazolone, the higher the reaction temperature must be.

The reaction of the azlactone copolymers with compounds having two or more reactive hydrogen atoms in the molecule leads to cross-linking. This takes place particularly quickly and under mild conditions if a diamine such as ethylene diamine is used as the cross-linking agent.

For example, with a diamine, ring opening and simultaneous joinder of two macromolecules occur as typified by the following formulas:

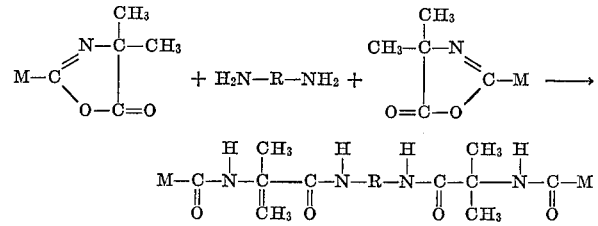

where M is the radical of a macromolecule

A catalyst is suitably added for cross-linking with polyols such as glycol, glycerin, or pentaerythritol.

Ethylene diamine; tri-aminoethyl amine

[N(CH₂CH₂NH₂)₃]

N,N'-di(t.-butyl-oxycarbonyl)-hexamethylene diamine

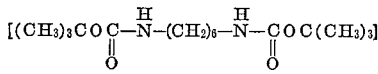

N-(aminoethyl)-piperazine; ethylene glycol; butane diol; glycerine; dimercapto ethane; ethanol amine; and glutaric acid dihydrazide are exemplary of monomeric cross-linking agents.

Macromolecular compounds having at least two functional groups per macromolecule can be employed as the same drying conditions, but without addition of ethylene diamine, is soluble in the organic solvents mentioned.

EXAMPLE 14

One-half of a mixture of 60 parts of styrene, 20 parts of butyl acrylate, 10 parts of acrylonitrile, 10 parts of 2-isopropenyl-4,4-dimethyl-oxazolone-5, and 1.5 parts of azoisobutyronitrile in 100 parts of butyl acetate was warmed to a temperature of about 70° C. in a reaction vessel with stirring. After the onset of polymerization, the temperature was held at about 70–80° C. while the other half of the mixture was added. One hour after this addition was complete, an additional 0.2 part of azoisobutyronitrile was added. The solution was then warmed for another four or five hours at 70°–80° C.

The solution polymer gave insoluble films after the addition of 3 parts of butanediol and 0.1 part of p-toluene sulfonic acid at drying temperatures of about 30° C.

EXAMPLE 15

A mixture of 45 parts of dibutylitaconate, 40 parts of styrene, 15 parts of 2-, (2'-N-methacrylamiodoisopropyl)-4,4-dimethyloxazolone-5, and 1.2 parts of dilauroyl peroxide were polymerized as in Example 1 in 90 parts of ethyl acetate and 60 parts of methyl ethyl ketone.

After the addition of 2.6 parts of tetramethylene diamine, a solution was obtained from which cross-linked films could be prepared at about 30° C. These films are slightly swelled by organic solvents such as acetone or acetic acid, but are nevertheless insoluble.

EXAMPLE 16

A mixture of 50 parts of vinyl toluene, 30 parts of butadiene, 20 parts of 2-isopropentyl-4,4-pentamethylene-oxazolone-5 and 2.5 parts of azoisobutyronitrile in 100 parts of toluene were polymerized at 70° C. under pressure over a period of 10 hours. The solution polymer, after the addition of 3 parts of hexamethylene diamine, gave insoluble films on drying at 30° C.

EXAMPLE 17

A mixture of 40 parts of vinyl propionate, 50 parts of vinyl chloride, 10 parts of 2-isopropenyl-4,4-tetramethylene-oxazolone-5, and 1.5 parts of azoisobutyronitrile in 100 parts of methyl ethyl ketone were polymerized at 70° C. over a period of 8 hours.

EXAMPLE 18

A mixture of 45 parts of n-hexylmethacrylate, 25 parts of N-methyl methacrylamide, 30 parts of 2-isopropenyl-4,4-dimethyl-oxazolone-5, and 1.5 parts of azoisobutyronitrile in 100 parts of ethyl acetate were polymerized at 70° C. over a period of 10 hours.

EXAMPLE 19

A mixture of 45 parts of mixed methacrylate esters of alcohols having 12–18 carbon atoms, 15 parts of dibutyl itaconate, 20 parts of N-vinyl pyrrolidone-2, 20 parts of 2-isopropenyl-4,4-dimethyl-oxazolone-5, and 1.5 parts of azoisobutyric acid ethyl ester in 150 parts of mineral oil was divided into thirds. One-third of the mixture was then added to the remaining two-thirds at 80° C. under an atmosphere of carbon dioxide over a period of three hours. After the addition of a further 0.5 part of azoisobutyric acid ethyl ester, the material was completely polymerized in an additional five hours.

What is claimed is:

1. The method of making a cross-linkable, solid azlactone copolymer, soluble in organic solvents, which comprises copolymerizing, at a temperature of from 0° C. to 200° C. and in the presence of a free-radical initiator, a monomer mixture consisting essentially of: (A) 0.5 to 30 percent by weight of an azlactone of the formula $$R_2-\underset{\underset{R_3}{|}}{\overset{\overset{R_1}{|}}{C}}-\underset{\underset{}{}}{\overset{}{}}\underset{O}{\overset{C=O}{}}$$
$$\phantom{xxxxxx}N\diagdown \diagup$$
$$\phantom{xxxxxxxx}C$$
$$\phantom{xxxxxxxx}|$$
$$\phantom{xxxxxxxx}R_3$$

wherein $R_1$ and $R_2$, taken alone, are each the same or different alkyl, cycloalkyl, aryl, or aralkyl, and $R_3$ is a polymerizable olefinically unsaturated member selected from the group consisting of vinyl, isopropenyl, acryloxyalkyl, methacryloxyalkyl, acrylamidoalkyl, and methacrylamidoalkyl; and (B) 70 to 99.5 percent of two or more distinct olefinically unsaturated monomers copolymerizable with and distinct from (A).

2. A cross-linkable, solvent-soluble, solid azlactone copolymer prepared according to the method of claim 1.

3. A copolymer as in claim 2 wherein said azlactone is 4,4-dialkyl substituted.

4. A copolymer as in claim 2 wherein (B) is at least one ester formed between acrylic or methacrylic acid and an alcohol having 1–18 carbon atoms and is present in an amount of at least 50 percent by weight of said monomer mixture.

5. A copolymer as in claim 2 wherein 0.5–20 percent by weight of said monomer mixture is a carboxylic acid comonomer (B).

6. A product as in claim 5 cross-linked with a polyamine cross-linking agent.

7. The method of making a cross-linked solid product, insoluble in organic solvents, from the azlactone copolymer of claim 2, which comprises combining said copolymer at a temperature from about 15° C. to about 80° C. with 0.1 to 99.5 percent, by weight of said copolymer, of a low molecular weight cross-linking agent having at least two azlactone-reactive functional groups.

8. The method as in claim 7 wherein said cross-linking agent is a polyamine.

9. The method as in claim 7 wherein said copolymer and cross-linking agent are combined in the presence of an acid or base to catalyze the cross-linking.

10. A cross-linked solid product prepared according to the method of claim 8, said product being insoluble in organic solvents.

References Cited

UNITED STATES PATENTS

| | | | |
|---|---|---|---|
| 3,355,518 | 11/1967 | Sullivan et al. | 260—78 |
| 3,449,329 | 6/1969 | Wildi | 260—78 |
| 3,488,327 | 1/1970 | Kollinsky et al. | 260—78 |

OTHER REFERENCES

Iwakura et al., Journal of Polymer Science, part A–1, vol. 4, October 1966, pp. 2649–2657.

Cleaver et al., Journal of the American Chemical Society, vol. 77, March 1955, pp. 1541–1543.

HAROLD D. ANDERSON, Primary Examiner

U.S. Cl. X.R.

117—161; 260—31.2, 32.8, 33.2, 33.6, 78.4, 78.5, 80.7, 80.72, 82.1, 85.5, 86.1, 88.1, 874

UNITED STATES PATENT OFFICE
CERTIFICATE OF CORRECTION

Patent No. 3,583,950           Dated June 8, 1971

Inventor(s) Kollinsky, Hubner and Markert

It is certified that error appears in the above-identified patent and that said Letters Patent are hereby corrected as shown below:

In the Heading, after "Claims priority," replace

"application Germany" by --applications in Germany,

July 1, 1966, R 43,605 and --.

Signed and sealed this 26th day of October 1971.

(SEAL)
Attest:

EDWARD M. FLETCHER, JR.        ROBERT GOTTSCHALK
Attesting Officer            Acting Commissioner of Patents